UNITED STATES PATENT OFFICE.

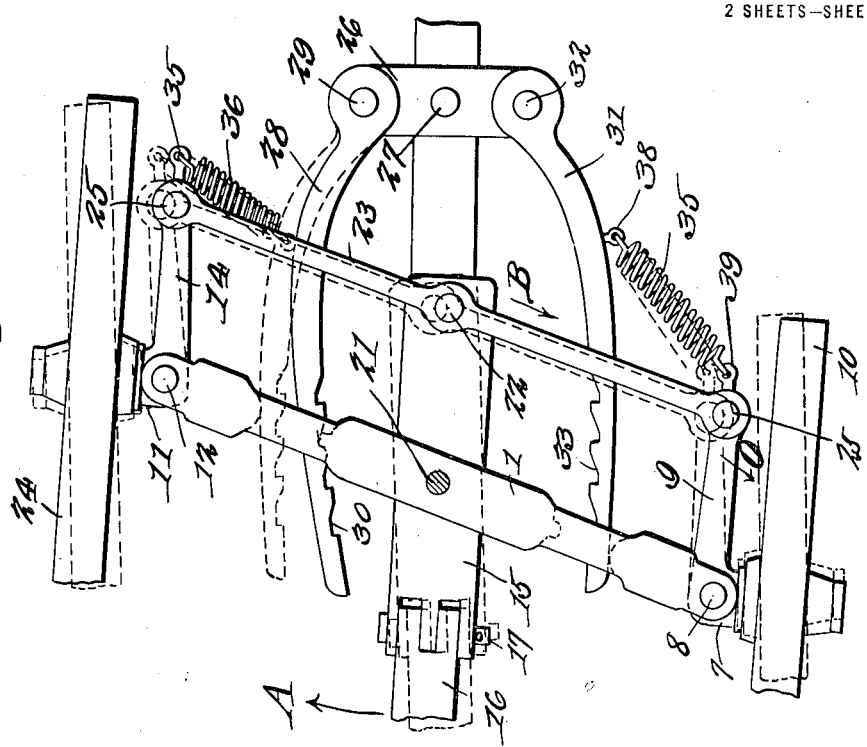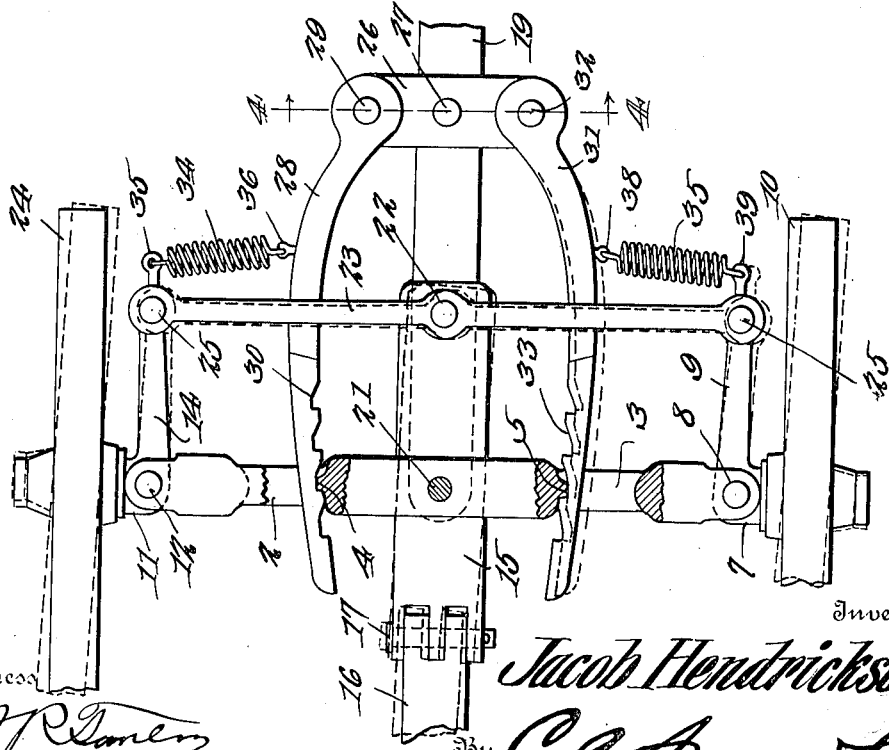

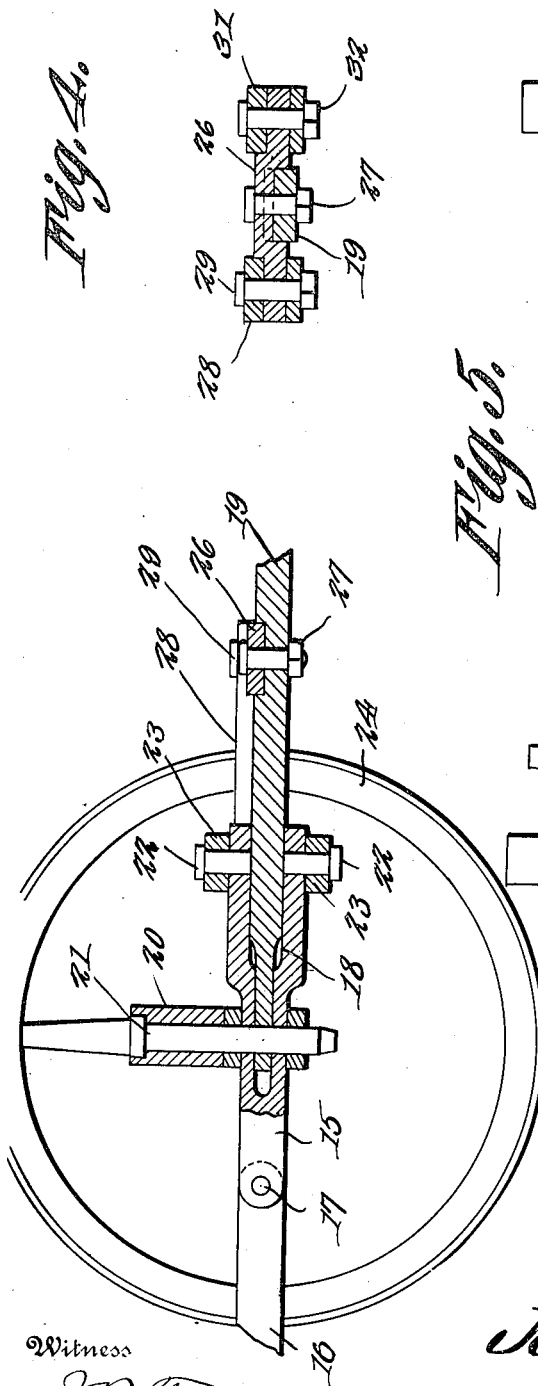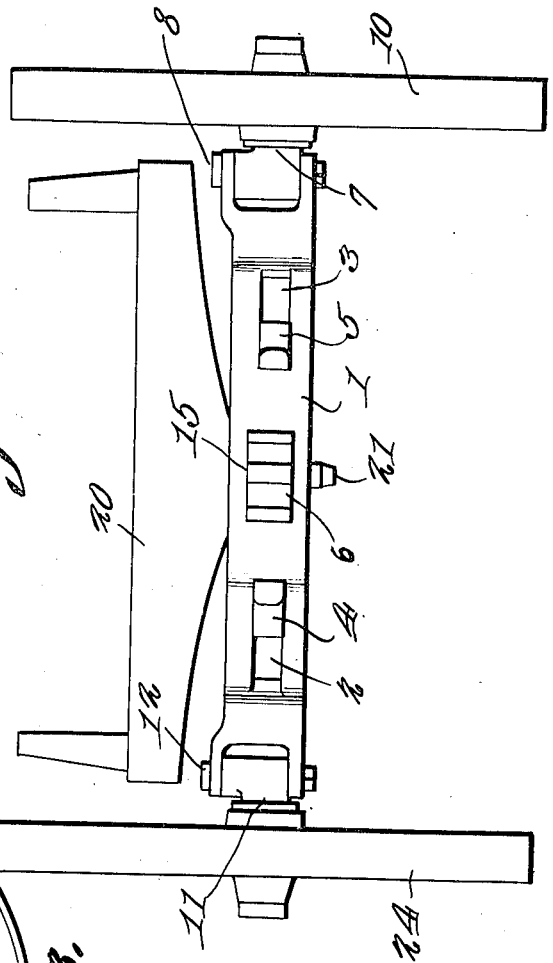

JACOB HENDRICKSON, OF MULLAN, IDAHO.

WAGON-TONGUE.

1,291,509.   Specification of Letters Patent.   Patented Jan. 14, 1919.

Application filed March 25, 1918.   Serial No. 224,577.

*To all whom it may concern:*

Be it known that I, JACOB HENDRICKSON, a citizen of the United States, residing at Mullan, in the county of Shoshone and State of Idaho, have invented a new and useful Wagon-Tongue, of which the following is a specification.

The device forming the subject matter of this application is a means for mounting a wagon tongue in such a way that the tongue will not swing laterally and strike the draft animals when one wheel of the vehicle drops into a mud hole or other depression in the highway, and it is the object of the invention to provide a simple but effective means whereby a lateral swinging of the tongue, under the conditions above alluded to may be avoided.

With the above and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings:

Figure 1 shows the invention in top plan, the parts thereof being arranged as they will appear when the vehicle is moving in the ordinary way along a relatively smooth road;

Fig. 2 is a top plan similar to Fig. 1, showing the parts of the device as they will appear when one of the wheels of the vehicle has dropped into a hole or depression of the highway;

Fig. 3 is a fragmentary longitudinal section taken through the tongue support and attendant parts, portions appearing in elevation;

Fig. 4 is a section on the line 4—4 of Fig. 1; and

Fig. 5 is a front elevation showing a vehicle wherein the invention has been embodied, portions being omitted.

The numeral 1 denotes the front axle of a vehicle. The main axle 1 has a transverse opening 2 and a transverse opening 3. A projection 4 extends from the axle 1 into the opening 2. A projection 5 extends from the axle 1 into the opening 3. The axle 1 has a central opening 6. A movable end or stub axle 7 is pivoted at 8 to the main axle 1. The movable axle end 7 includes a rearwardly extended arm 9. An end or stub axle 11 is pivoted at 12 to the main axle 1. The end 12 includes a rearwardly extended arm 14. A ground wheel 24 is journaled on the axle end 11.

A tongue support 15, in the form of a bar, extends through the opening 6. A tongue 16 is pivoted at 17 to the forward end of the support 15 for vertical swinging movement. There is a slot 18 in the rear end of the support 15. The numeral 19 marks a reach extended into the slot 18. A bolster 20 is superposed on the axle 1. A king bolt 21 passes downwardly through the bolster 20 and the axle 1. The tongue support 15 and the reach 19 are mounted to swing on the king bolt 21. Cross rods 23 extend transversely of the rear end of the tongue support 15 and are connected thereto by pivot elements 22. The outer ends of the cross rods 23 are pivoted at 25 to the rear ends of the arms 14 and 9. A transverse bracket 26 is secured rigidly at 27 to the reach 19. The bracket 26 is spaced from the rear end of the tongue support 15.

A dog 28 is pivoted at 29 to one end of the bracket 26. The dog 28 passes through the opening 2 and has seats 30 adapted to coöperate with the projection. A dog 31 is pivoted at 32 to the other end of the bracket 26. The dog 31 passes through the opening 3 and has seats 33 adapted to coact with the projection 5. A spring 34 is provided and is attached at 35 to the arm 14. The inner end of the spring 34 is attached at 36 to the dog 28. The numeral 37 marks a spring attached at 38 to the dog 31 and attached at 39 to the arm 9.

When the vehicle is moving along the highway in the ordinary manner, with the axle 1 disposed at right angles to the reach 19, one or the other of the dogs 28—31 is maintained by the corresponding spring 34—35 engaged with the axle 1, by means of the projections 4—5, so that the axle 1 cannot swing on the king bolt 21. The tongue support 15 may be swung on the king bolt 21 by means of the tongue 16, the rear end of the support 15 moving the cross rods 23 endwise, the arms 14 and 9 swinging the axle ends 7 and 11 to permit a steering of the vehicle.

Let it be supposed that the ground wheel 24 drops into a depression. Then the tongue 16 swings to a slight extent in the direction of the arrow A in Fig. 2, the support 15 swinging on the king bolt 21. The cross rods 23 move in the direction of the arrow B and the arm 9 swings in the direction of the arrow O. The spring 35 is elongated and draws the dog 31 out of engagement with the projection 5 on the axle 1, but the spring 34 is compressed and holds the dog 28 in engagement with the projection 4 on the axle 1. Before the tongue 16 has swung in the direction of the arrow A to an extent sufficient to strike the draft animal, the dog 31 is freed from the projection 5 by the pull of the spring 35 which has been elongated, the wheel 24, being in a depression, lags behind the wheel 10, and the axle 1 swings into the position shown in Fig. 2, the projection 4 clicking over the seats 30 on the dog 28 and ultimately engaging in one seat. From the foregoing it will be understood that when the wheel 24 drops into a depression and lags behind the wheel 10, the tongue 16 is not swung in the direction of the arrow A through an extended arc, and with great force, against the draft animal. In order to release the parts from the position of Fig. 2 and to restore them to the position of Fig. 1, the tongue 16, along with the support 15, is swung on the king bolt 21 in a direction opposite to that indicated by the arrow A, the draft animals being guided to produce this result.

When the support 15 is swung as aforesaid, the bars 23 move in a direction opposite to that indicated by the arrow B, the tension is taken out of the spring 35 and the same is put under compression, the spring 34 being first elongated to disengage the dog 28 from the projection 4, and the spring 34 subsequently being put under compression, the parts returning to the position of Fig. 1.

Having thus described the invention, what is claimed is:

In a device of the class described, a main axle; stub axles pivoted thereto and having angular arms; a tongue support and a reach pivoted to the main axle; a cross rod pivoted to the arms and to the rear end of the tongue support; dogs pivoted to the reach and coacting with the main axle; spring means responsive to the movement of the arms for controlling the dogs; and ground wheels journaled on the stub axles.

In testimony that I claim the foregoing as my own I have hereto affixed my signature in the presence of two witnesses.

JACOB HENDRICKSON.

Witnesses:
JOHN MORRIS,
H. G. LOOP.